(No Model.)  4 Sheets—Sheet 1.

G. H. STAHL.
INCUBATOR.

No. 593,863.  Patented Nov. 16, 1897.

Witnesses:
J. M. Hailey Jr.
J. H. Jordon

Inventor:
Geo. H. Stahl
By Chas. E. Barber
His Attorney

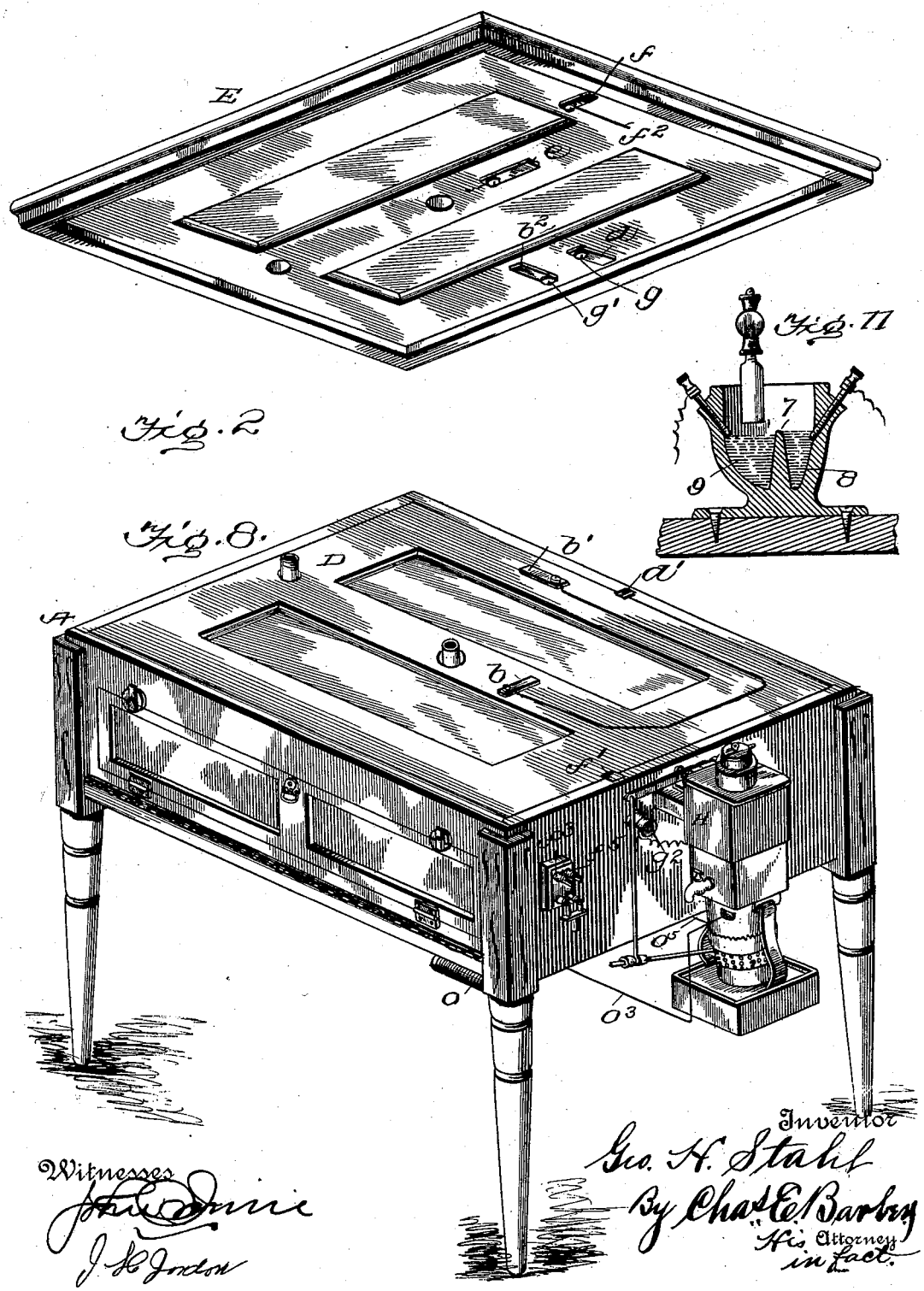

(No Model.) 4 Sheets—Sheet 3.
G. H. STAHL.
INCUBATOR.
No. 593,863. Patented Nov. 16, 1897.
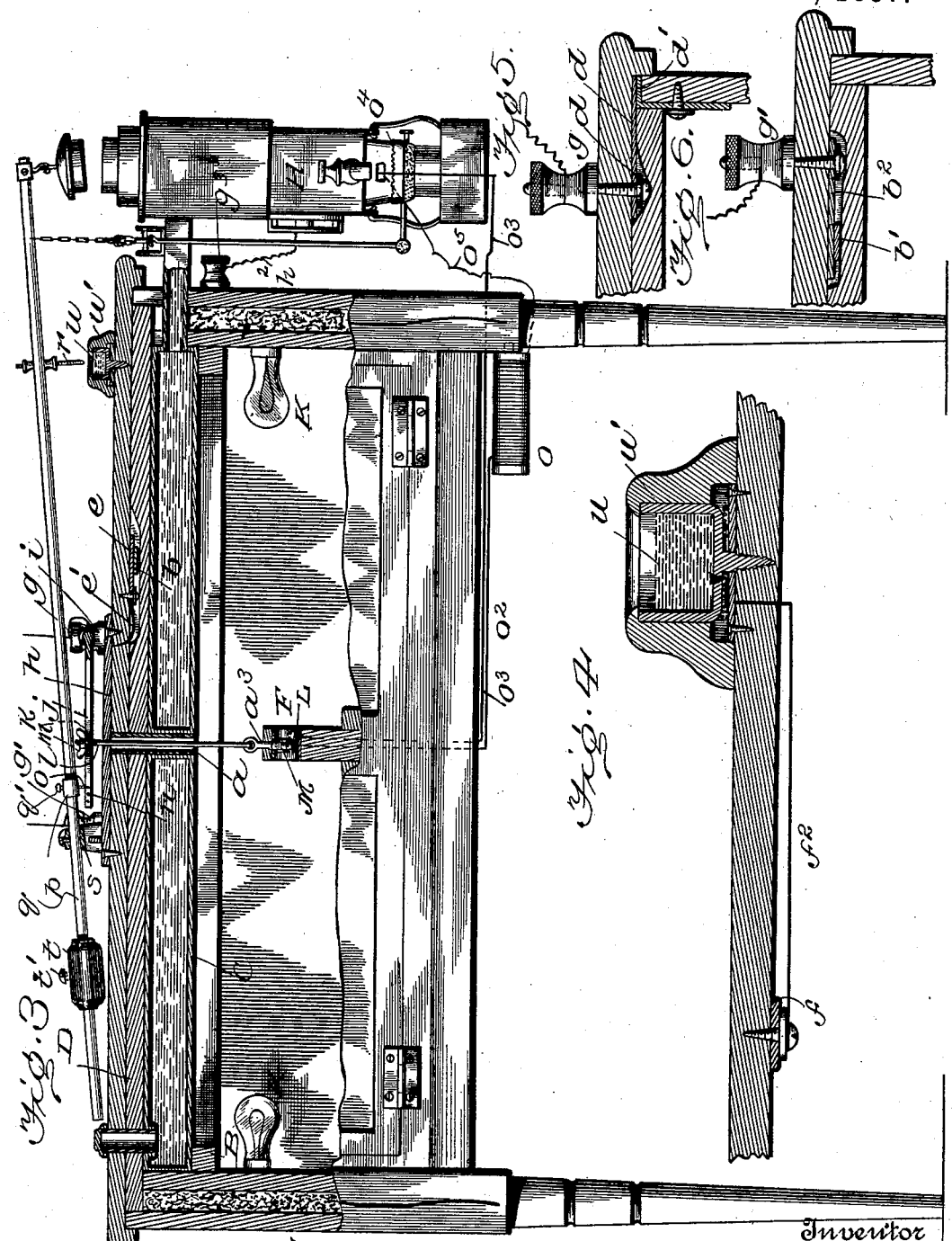
Witnesses
Inventor
Geo. H. Stahl
By Chas. E. Barber
His Attorney in fact.

(No Model.) 4 Sheets—Sheet 4.
G. H. STAHL.
INCUBATOR.
No. 593,863. Patented Nov. 16, 1897.
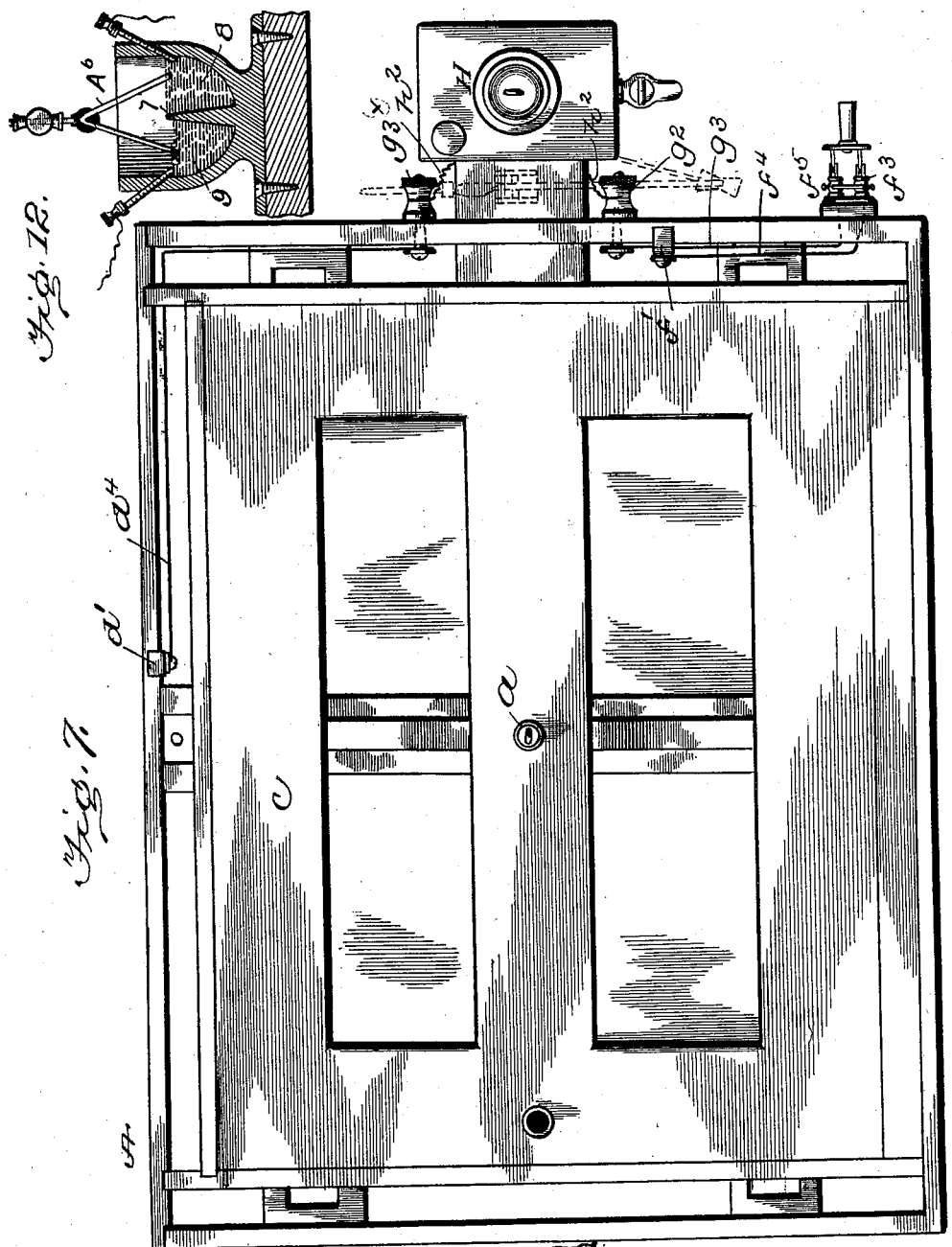
Witnesses
Inventor
Geo. H. Stahl
By Chas. E. Barber
His Attorney in fact.

UNITED STATES PATENT OFFICE.

GEORGE H. STAHL, OF QUINCY, ILLINOIS.

INCUBATOR.

SPECIFICATION forming part of Letters Patent No. 593,863, dated November 16, 1897.

Application filed March 1, 1897. Serial No. 625,552. (No model.)

*To all whom it may concern:*

Be it known that I, GEORGE H. STAHL, a citizen of the United States, residing in Quincy, in the county of Adams and State of Illinois, have invented certain new and useful Improvements in Incubators, of which the following is a full, clear, and exact description, such as will enable those skilled in the art to which my invention appertains to make and use the same, reference being had to the accompanying drawings, in which—

Figure 1:
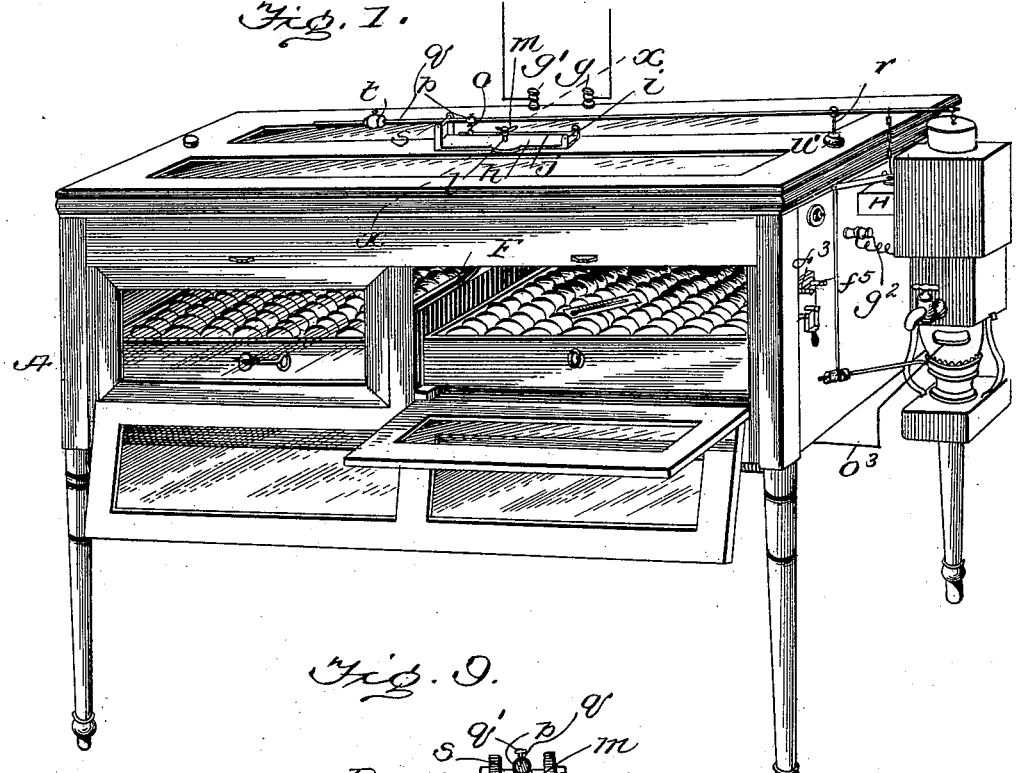
Figure 2:
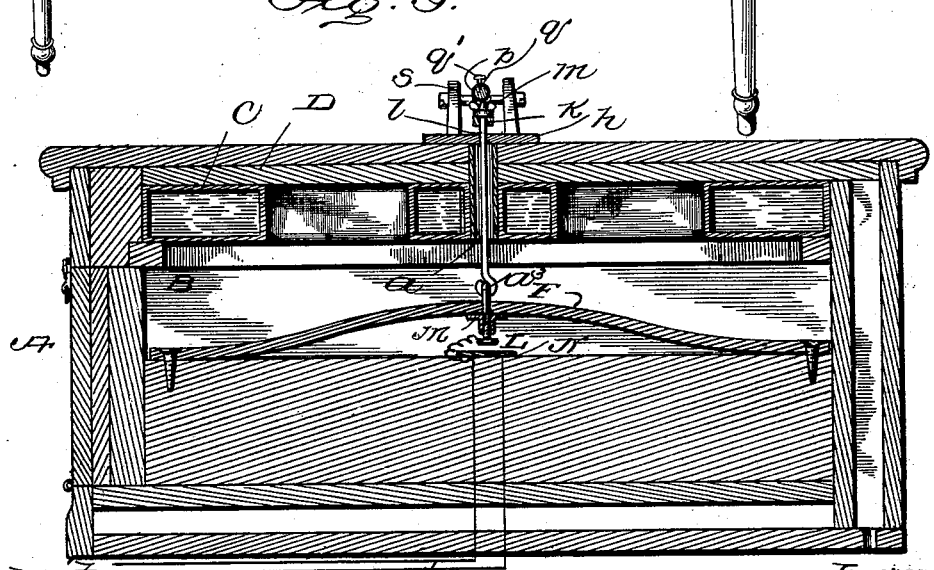

Figure 1 is a perspective view of the incubator. Fig. 2 is a perspective view showing the upper cover removed and looking at the under side of the same. Fig. 3 is a side elevation, partially in section. Fig. 4 is a detail section of the mercury-cup. Figs. 5 and 6 are detail sections of the electrical contacts. Fig. 7 is a plan view with parts omitted. Fig. 8 is a perspective view of the incubator with the outer cover removed. Fig. 9 is a section on line $x\ x$ of Fig. 1. Fig. 10 is a section of a mercury-cup having electrical terminals located therein. Fig. 11 is a similar view. Fig. 12 shows an inverted-U-shaped contact-piece for the current-controller.

The object of my invention is to provide an incubator with appliances whereby it may be heated and regulated automatically by electricity.

Another object of my invention is to provide an incubator which may be automatically heated and regulated by an agent which does not generate noxious and poisonous gases and which does not produce or cause to be produced disagreeable and injurious odors.

Another object of my invention is to provide an incubator by the use of which when provided with my appliances the operator may be assured that the incubator will be constantly heated to a proper temperature, regulated automatically, and constantly supplied with a heating agent, even though the electrical current should for any reason be interrupted and cut off.

Another object of my invention is to provide an incubator which shall of itself be an ornament and an attraction and of service in the parlor to enable the scientific observation and study of incubation, and to provide an odorless parlor-incubator for the instruction and amusement of incubator parties and other social gatherings.

Another object of my invention is to provide an incubator which shall be automatically heated and lighted by an odorless agent which will not vitiate the atmosphere of the room containing the incubator nor the heated air in the interior of the incubator proper.

Heretofore incubators have been subject to objection or criticism because the heating agent was likely to produce a disagreeable and injurious odor. Furthermore, it has not always been easy to see clearly the movements of the chickens inside of the incubator.

By providing the incubator with an electrical heating and regulating apparatus and by providing the interior of the incubator with an electric light the objections above referred to are entirely obviated.

In carrying out my invention I employ mechanism and appliances one form of which is illustrated in the accompanying drawings.

It should be distinctly understood that I do not limit myself to the exact location of electrical conductors and regulating appliances shown, as the details of arrangement may be changed indefinitely without departing from the spirit of my invention and without interfering with its usefulness and operation. I therefore wish to be distinctly understood as reserving the right to vary and alter the construction and arrangement, and I do not wish to be understood as limiting myself to the construction and arrangement shown.

In the accompanying drawings, A designates the main casing, which is provided with an interior strip or ledge B, which supports a water-tank C, which is provided with a central opening $a$. An inside cover D fits over the water-tank and is provided on its top with the contact-plates $b$ and $b'$, connected together electrically by a conductor $c$. An outside cover E is provided with a contact-plate $b^2$, which is adapted to contact with the plate $b'$ on the inside cover. The outside cover is also provided with another contact-plate $d$, which is adapted to contact with the plate $d'$ in the edge of the casing. The outside cover is also provided with a contact-plate $e$, which when the cover is in position contacts with the plate $b$. The outside cover is also provided with a contact-plate $f$, which contacts with the plate $f'$ in the edge of the end of the casing. The plate $b^2$ on the outside cover is secured in position by the binding-screw $g'$, while the plate $d$ is secured in position by the binding-screw $g$. The plate $e$ is provided with an electrical conductor $e'$, which passes through the outside cover and is connected electrically with the plate $h$, which is provided with a pair of ears $i$, between which is secured, pivotally, the tilting lever $j$, which is provided with an opening $k$, through which passes the rod $l$, which is provided with a thumb-screw $m$. The lever $j$ is provided with a series of holes $n$, into which is adapted to be hooked a hook $o$, which in turn is secured to an adjustable sleeve $p$, provided with a set-screw $p'$ on the tilting bar $q$. The current-controller, which consists of a tilting bar $q$, is pivotally secured at $s$ between the ears $s'$ on the plate $e'$. The lever $q$ is provided with an adjustable counterbalancing-weight $t$, having a set-screw $t'$. The tilting lever $q$ is provided with an adjustable plunger $r$, which is adapted to contact with the mercury $u$ in a mercury-cup $u'$ on the outside cover. The mercury-cup $u$ is connected electrically with the contact-plate $f$ through the medium of the electrical conductor $f^2$. A thermostat F is arranged across the interior of the incubator and is provided with a loop $a^3$, which is adapted to receive a hook at the lower end of the rod $l$. The contact-plate $f'$ is connected electrically with the switch-post $f^3$ by the conductor $f^4$. The switch-post $f^5$ is connected electrically with the binding-post $g^2$ by the conductor $g^3$. An electric heater H is connected electrically with the binding-posts $g^2$ and $g^{3\times}$ by the electrical conductors $h^2 h^2$. The binding-post $g^{3\times}$ is connected electrically with the contact-plate $d'$ through the conductor $d^4$.

In addition to the electric heater for the incubator I provide a lamp with an electric lighting device, and the thermostat is to be so arranged that should the electric current be cut off at any time as soon as the temperature gets low enough to endanger the eggs it will mechanically close the circuit of the dry battery and ignite the wick of the lamp or the gas, should gas be used instead of oil. Many ways will suggest themselves for the purpose.

I show an adjustable screw L secured to the under side of the thermostat by the hollow screw-threaded sleeve M. Below this screw L is a contact-plate N, connected electrically with a dry cell-battery or any other battery O through the conductor $o^2$. The screw L is connected with a conductor $o^3$, which leads from the screw to the region of the lamp-wick $o^4$. Another conductor $o^5$ runs from the battery to the region of the lamp-wick. When the electrical current is cut off from the heater H, the thermostat will cool and contract, bringing the screw L down into contact with the plate N, mechanically closing the circuit of the battery O, causing the lamp-wires $o^3$ and $o^5$ to spark and light the lamp-wick. It will be understood that the lamp-wires $o^3$ and $o^5$ are provided with a sparking-coil of suitable construction.

The electric lights K K are located within the main casing of the incubator, at either end or in any other suitable position, and they are to be connected electrically in such a way that they may be caused to furnish light at all times, or they will be provided with switches which may be manipulated to cause them to furnish light at will or during the process of hatching.

In Fig. 10 I show a mercury-cup 2, preferably made of non-conducting material and provided with metallic plates or rings 3 and 3'. As the mercury might ooze through the holes 4 and 4', I have made them vertical, and screws 5 and 5' may be inserted into these holes, one contacting with the ring 3 and the other with the ring 3', or the plates 3 and 3' may be dispensed with altogether, leaving the screws 5 and 5' to contact with the mercury in the cup directly. It will be observed that the mercury (or any other proper fluid may be used) is below the line of the bottom edge of the upper ring or plate. Now by lowering the screw or plunger $r$ into the mercury it will cause the mercury to rise until it contacts with the upper ring or plate, thus completing the circuit. When the heat is too intense, the thermostat will cause the plunger to rise and the mercury to fall, and the circuit will thus be broken. This form may be used, and if it is the current-controller and its mechanism need not be brought into the circuit and the wiring will be lessened and simplified, as a wire may be run directly to one of the contact-pieces in the cup from the binding-post $g$.

In Fig. 11 I show a cup having a partition 7, each side of which is provided with mercury or other liquid. The chamber 8 is somewhat larger than the chamber 9, so that as the plunger $r$ comes down into the chamber 9 the liquid is forced over the partition, completing the circuit through the mercury. When the heat is too intense, the plunger rises, the mercury flows back into the chamber 9, and the circuit is broken. It will be seen at a glance that other forms of devices might be employed to make and break the circuit; but as the tilting lever-bar which makes and breaks the circuit is hung very delicately it is necessary to provide a contact which will offer the least possible resistance. For this reason I use liquid, preferably mercury, because it is a good non-hygroscopic conductor and will not evaporate. The plunger $r$ may in this instance be made of glass or other material which will not be affected in any way by the mercury.

In Fig. 12 I show an inverted-U-shaped copper or other metallic contact-piece $A^6$, which may be used on the circuit-controller. By using this form the current will pass through the contact-piece $A^6$, and it will not be necessary to appreciably disturb the mercury or other liquid in the chambers 8 and 9.

The general construction of the incubator and the general regulating devices are all covered by patents owned by me, and I therefore do not deem it necessary to go into such details in this application, as the application comprehends, broadly, an electric incubator, in combination with means for regulating the heat and for providing a separate heating agent should the electricity for any reason be cut off.

Instead of using a sparking-coil in connection with the lamp-wires $o^3$ and $o^5$ a piece of fine wire might be placed in the circuit in contact with the wick of the lamp, and when the circuit is closed by the action of the thermostat the wire will be rendered incandescent and light the wick.

Having described the objects, uses, and advantages of my invention, what I believe to be new and what I desire to secure by Letters Patent of the United States, and what I therefore claim, is—

1. A casing having an electric heater and electric conductors; in combination with a lamp located near the heater and means for automatically lighting the lamp when the electric current is cut off from the electric heater, substantially as described.

2. A casing having an electric heater and electrical conductors; in combination with a lamp located near the heater and means for automatically and mechanically lighting the lamp when the electric current is cut off from the electric heater, substantially as described.

3. The combination with an incubator, of an electric heater, a pivoted counterbalanced arm adapted to make and break the electric circuit of said heater, and a thermostat adapted to actuate said arm, substantially as described.

4. As an improvement in incubators, the combination with a main casing, provided with an electric heater and electrical conductors, of receptacles containing a liquid located in the circuit and between the electrical conductors; and means actuated by the varying degrees of heat in the incubator for causing the said liquid to establish, and cut out, alternately, the electric current between the electrical terminals, substantially as described.

5. In an incubator, the combination with a main casing, of an electric heater and electric conductors therefor, a cup and a liquid contained therein, the said cup and liquid connected in the circuit with said conductors, a plunger adapted to dip into and be withdrawn from said liquid and to make and break the electrical circuit therethrough, and a thermostat adapted to actuate said plunger, substantially as described.

6. As an improvement in incubators, a main casing provided with an electric heater and conductors therefor; in combination with a thermostat having a contact-plate connected thereto and an electric conductor leading therefrom, a second plate located adjacent to and in position to contact with the plate secured to the thermostat and an electrical conductor, leading therefrom, and a battery located between the last-mentioned electrical conductor and a lamp, the electrical conductor leading from the plate on the under side of the thermostat to the lamp, the two conductors constructed substantially as described and located substantially as shown, whereby the lamp will be automatically lighted by the contraction of the thermostat and the consequent contact of the plate secured to the thermostat, with the contact-plate secured adjacent thereto and in position to contact therewith, substantially as shown and for the purposes specified.

7. As an improvement in incubators, a main casing provided with an electric heater and conductors therefor; in combination with an automatic current-controller and a mercury-cup having a partition therein and having two chambers and adapted to have a liquid located within the chambers, substantially as described, whereby the displacement of the liquid by means of the controller in one of the chambers of the cup will raise the mercury in the same until it establishes electrical connection with the other chamber in the cup, thus making the circuit, substantially as described.

8. In an incubator, a main casing, provided with an electrical heater and conductors therefor, in combination with a cup located in the circuit and provided with a liquid and a tilting rod $q$ carrying a plunger and provided with means for operating it automatically, substantially as described, whereby the circuit may be broken or closed at will, to regulate and determine the temperature of the interior chamber of the incubator, substantially as described.

In testimony whereof I affix my signature in the presence of two witnesses.

GEORGE H. STAHL.

Witnesses:
HARRY H. CHARLES,
JOHN C. ORDING.